United States Patent [19]
Couchman

[11] 3,902,381
[45] Sept. 2, 1975

[54] METHOD OF MAKING A FORGING DIE

[75] Inventor: Richard Couchman, New Kensington, Pa.

[73] Assignee: Aluminum Company of America, Alcoa Center, Pa.

[22] Filed: Dec. 26, 1973

[21] Appl. No.: 427,461

[52] U.S. Cl. .............................................. 76/107 R
[51] Int. Cl.² ......................................... B21K 5/20
[58] Field of Search... 76/107, 107 A, 107 B, 107 C

[56] References Cited
UNITED STATES PATENTS

| | | | |
|---|---|---|---|
| 329,801 | 11/1885 | Allderdice | 76/107 A |
| 1,836,821 | 12/1931 | Singer | 76/107 A |
| 2,232,417 | 2/1941 | Unckel | 76/107 A |
| 2,245,608 | 6/1941 | Rogers | 76/107 A |
| 2,515,589 | 7/1950 | Brauchler | 76/107 R |

*Primary Examiner*—Harrison L. Hinson
*Attorney, Agent, or Firm*—Teare, Teare & Sammon

[57] ABSTRACT

A forging die having an irregularly shaped cavity and a method of making the same. A cylindrical die has a calculated interference fit in a cylindrical shrink ring which is applied to it without welding or fusing, so as to prestress the material of the die, without detailed calculations of the stresses induced in the die by the ring and without making allowances for distortion of the cavity by the ring. Thereafter the irregular cavity is cut or sunk into the die. During the sinking of the cavity, stresses in the ring are partially relieved and distortion of the cavity is machined out as the machining proceeds. At such time, compressive stresses developing in the corners of the cavity will be limited by plastic deformation to the yield strength of the material. The compressive stresses remaining after the cavity is sunk provide a working stress range of about twice the range which would be available without the prestressing.

3 Claims, 7 Drawing Figures

METHOD OF MAKING A FORGING DIE

BACKGROUND OF THE INVENTION

The use of shrink rings is well known for the construction of extrusion cylinders, impact extrusion dies and other structures with symmetrical cavities subjected to internal pressure. Such construction is useful because (1) it places the inner part in compression, thereby increasing the working stress range of the material, and (2) the stresses can be calculated readily with thick cylinder formulae to provide assurance that each design will perform as desired. The use of such technique to increase the load carrying capacity of forging dies with irregularly shaped cavities has been limited generally to salvaging of broken dies by shrinking the ring around the die to hold the parts together. The use, however, of shrink rings on new dies which have the irregularly shaped cavity cut therein appears to be limited by the fact that there is no simple way to calculate the required interference fit between the die and the ring to accomplish the desired results, without creating excessive compression stresses in the corners of the cavity. Moreover, there is no simple way to determine and allow for distortion of the cavity when the ring is shrunk onto the die.

SUMMARY OF THE INVENTION

The present invention overcomes the foregoing problems by fitting a cylindrical shrink ring onto a solid cylindrical die block and utilizing an interference fit without welding and fusing, which will prestress the block to the desired degree, and thereafter sinking the cavity within the block, while it is held in prestressed condition by the ring. The amount of interference fit between the ring and the block to achieve the desired degree of prestressing of the material in the block and the resulting stresses in the ring can be calculated for a ring on a solid cylindrical block. Thereafter, when the cavity is sunk into the prestressed block, any cavity distortion which results from relief of the stresses is removed as sinking of the cavity proceeds. If compressive stresses accumulate in the corners of the cavities, they will be limited by plastic deformation to the value of the yield strength of the material and will remain there as a prestress that will increase the allowable range of working stress to approximately twice what the range would be in a one-piece die having no prestress.

DESCRIPTION OF THE PREFERRED EMBODIMENT

Figure 1:
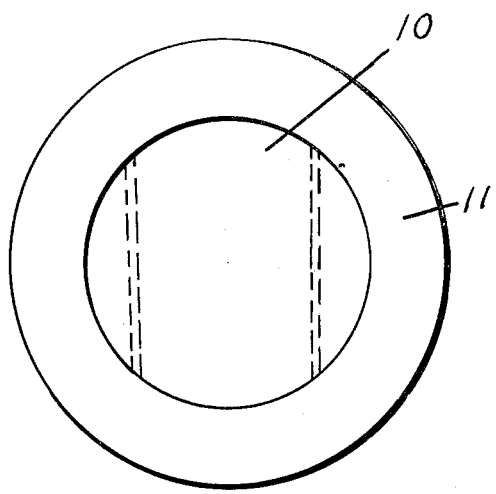
FIG. 1 is a top plan view of a die block or blank and an enclosing ring having an interfitting engagement embodying the present invention.
Figure 2:
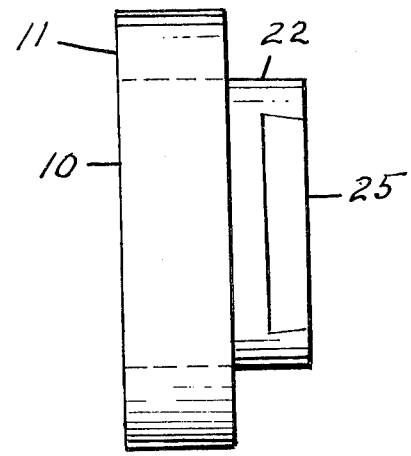
FIG. 2 is a front elevational view of the assembly of FIG. 1.
Figure 3:
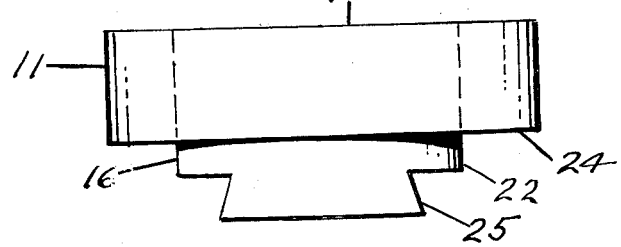
FIG. 3 is a side elevational view of the assembly of FIG. 1.

In FIGS. 1 to 3, a cylindrical die blank or block 10 is shown as embedded within a cylindrical shrink ring 11. The ring has a calculated interference fit with the block, and the amount of the interference fit will be determined as hereinafter set forth. After the ring is made to the desired dimensions, it is heated until it will fit over the die block and then is allowed to cool by making a shrink fit onto the block. The amount of interference between the block and the ring before the ring is heated will prestress the die block within a predetermined limit to which the block can be safely stressed. The die block is shown as having a portion 22 which projects downwardly from the face 24 of the ring and terminates in an extension or shank 25 which is adapted to be fitted into a die carrier on the bed of a press (not shown).

By shrinking the ring onto the die blank before the cavity is cut therein, the amount of interference fit between the blank and the ring and the resulting stresses in the ring can be readily calculated from known formulae. When the cavity is sunk into the pre-stressed die blank, any cavity distortion which results from relief of the stresses is removed as sinking of the cavity proceeds. If compressive stresses accumulate in the corners of the cavity, they will be limited by plastic deformation to the value of the yield strength of the material and will remain there as a prestress stress that will increase the allowable range of working stress to approximately twice that which would occur in a one-piece die having no prestress.

Figure 4:
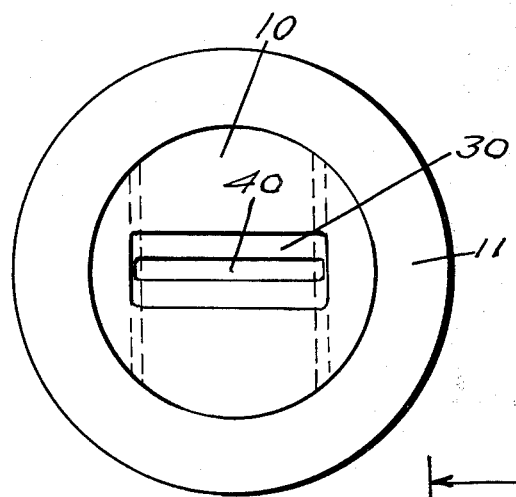
FIG. 4 is a top plan view of the assembly of FIG. 1 with a cavity sunk or cut in the die block.
Figure 5:
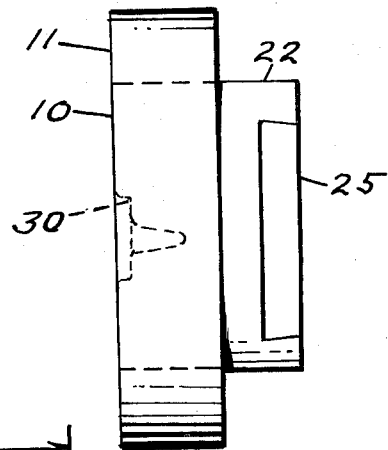
FIG. 5 is a front elevational view of the assembly of FIG. 4.
Figure 6:
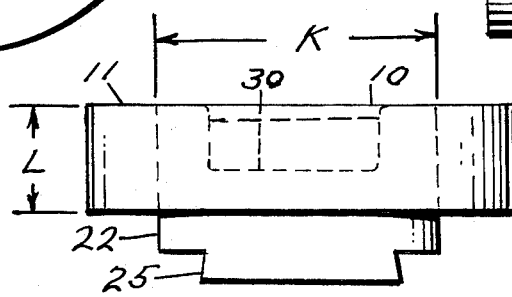
FIG. 6 is a side elevational view of the assembly of FIG. 4.
Figure 7:
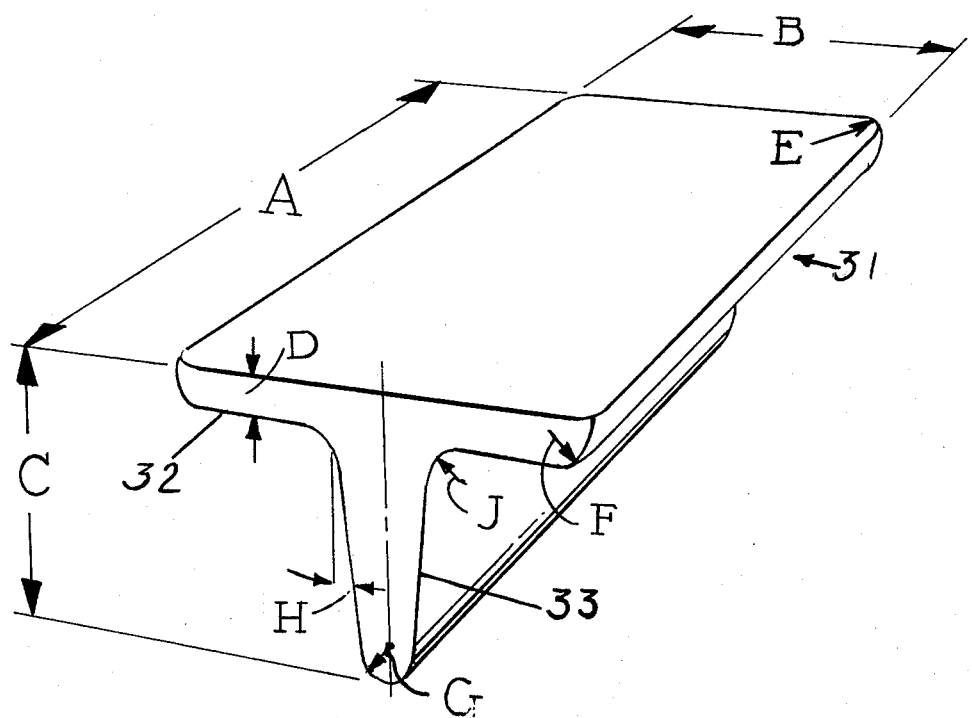
FIG. 7 is a perspective view of an illustrative die impression shown in the drawings.

As an example of a procedure by means of which the present invention may be carried out, FIGS. 4, 5 and 6 show an irregularly shaped cavity 30 cut within the die block for forming a forging which is illustrated in FIG. 7. The forging represents a T-bar 31 having selected dimensions as follows:

Length A — 8 inches
Width B — 3.5 inches
Depth C — 3 inches
Thickness D of flange 32 — 0.375 inch
Radius E of each corner on the top surface of the flange — 0.375 inch
Radius F of the longitudinal edges of the flange — ⅜ inch
Radius G at the bottom of the tongue 33 — ¼ inch
Draft H of the tongue — 5°
Radius J between the upper end of the tongue and the under side of the flange — ⅜ inch To accomodate a cavity which will produce an impression having the foregoing dimensions, a die blank is selected of cylindrical form having adequate external diameter and thickness with an extension for attachment to the bed of a forging press. Based upon knowledge and experience of one skilled in the art, a die block would be selected having a top diameter K of 12.000 inches, a thickness L of 6 inches with a standard shank 25 which is suitable for application in a 1,500 ton press.

The ring size requirements for prestressed dies with irregular impressions are calculated on basic assumptions, such as, (1) available formulae for stresses in shrink fit cylinders, (2) a maximum forging load such as 80,000 psi, (pounds per square inch), and (3) a maximum permissable working stress for the die material which should not exceed 100,000 psi, the latter of which is the approximate fatigue strength of FX-2 die material.

Available formulae for shrink fit calculations are as follows:

$P_1$ = Internal pressure on a cylinder
$P_2$ = External pressure on a cylinder
$P$ = Pressure developed between two shrunk fit cylinders
$a$ = Inside radius of a cylinder
$b$ = Outside radius of a cylinder
$c$ = Outside radius of a support ring in a shrink fit assembly
$r$ = Any given radius
$\delta$ = Excess of $b$ over the inside radius of a support cylinder, i.e., one half the interference
$E$ = Modulus of elasticity = $29 \times 10^6$ for steel
$S$ = Stress
$S_T$ = Tangential stress
$S_C$ = Compressive stress
$S_T$max = Maximum tangential stress
$S_C$max = Maximum compres For a shrink fit $$P = \frac{E\delta}{b} \times \frac{(b^2-a^2)}{2b^2} \frac{(c^2-b^2)}{(c^2-a^2)} \quad (1)$$

Tangential (tensile) stress as a result of internal pressure $$S_T = P_1 \times \frac{a^2}{(b^2-a^2)} \times \left(\frac{b^2}{r^2}+1\right) \quad (2)$$

For $r = a$ $S_T$ is maximum and equation (2) becomes $$S_T\text{max} = P \times \frac{(a^2+b^2)}{(b^2-a^2)} \quad (3)$$

For the condition where pressure is developed between two shrunk fit cylinders, the tangential stress developed on the outer cylinder according to Formula 2 is $$S_T = P \times \frac{b^2}{(c^2-b^2)} \times \left(\frac{c^2}{r^2}+1\right) \quad (2a)$$

For $r = b$ = outside radius of inner cylinder and inside radius of outer cylinder, equation (2a) becomes $$S_{Tmax} = P \times \frac{(b^2+c^2)}{(c^2-b^2)} \quad (3a)$$

For the condition where $P_1 = P$ the tension on the ID of an outer shrunk fit cylinder can be found directly from the formula $$S_{Tmax} = \frac{E\delta}{2b^3} \times \frac{(b^2-a^2)(b^2+c^2)}{(c^2-a^2)} \quad (4)$$

Compressive stress as a result of external pressure on a cylinder $$S_C = \frac{P_2 b^2}{(b^2-a^2)} \times 1 + \left(\frac{a^2}{r^2}\right) \quad (5)$$

$S_C$ is maximum when $r = a$ and equation (5) becomes $$S_{cmax} = \frac{2P_2 b^2}{(b^2-a^2)} \quad (6)$$

For shrunk fit cylinders where $P = P_2$, $S_{cmax}$ at inner surface of inner cylinder becomes $$S_{cmax} = \frac{E\delta}{b} \times \frac{(c^2-b^2)}{(c^2-a^2)} \quad (7)$$

Application of the foregoing formulae to the dimensions selected for the die block resulted in a shrink ring having an outside diameter of 18 inches, a depth of 5 inches, and a wall thickness of 3 inches. It also resulted in the determination of an interference fit between the die block and ring of 0.002 per inch of the outside diameter of the die block. Similarly, application of the formulae resulted in a determination that the prestress on the outer surface of the support ring, prior to die sinking, would be 25,600 psi tension, that the prestress on the inner surface of the support ring, prior to die sinking, would be 42,000 psi tension, and that the prestress on the inner surface of the support ring after the impression was sunk would be 29,000 psi tension.

The calculations also showed that the maximum stress would occur at the inner surface of the support ring in the event that the die would split under the maximum forging load of 80,000 psi. In such case, the load applied to the ring would be 64,000 psi which, combined with the 29,000 psi prestress would add up to 93,000 psi. This would be within the 100,000 psi design limit originally selected.

An interference of 0.002 inches per inch of die block diameter would result in a calculated interference between the die block and the shrink ring of 0.024 inches total, thus resulting in an internal diameter of the ring of 11.976 inches. After the ring has been shrunk onto the die, the cavity is then sunk into the prestressed block, as by electrical discharge machining.

As a means of ascertaining the original level of prestress, strain gauges were attached to the support ring and to the impression, and the level of prestress was then measured by zeroing the gauges in the prestressed condition, removing the die from the support ring and re-reading the gauges. Stresses on the gauges which were on the outer surface of the support ring varied from 22,000 to 31,000 psi tension which compares favorably to the calculated value of 25,600 psi for a solid die blank. Since part of the blank was solid and part was relieved by the impression, a variation of the stresses in such areas was anticipated, and this was confirmed by the results as the lower stresses occurred at the top of the ring, where the impression of the die blank offered relief, whereas the higher stresses occurred at the bottom of the ring where the die blank remained solid.

One gauge was located in the bottom of the cavity on the axis of the die block, as indicated at 40 in FIG. 4, which is the most critical area for die failure. It showed the highest compressive stress values and greatest stress concentration of all the areas measured and was, in fact, substantially equal to the typical yield strength of Hardtem B and FX-2 which are the die steels most commonly used in forging dies.

Despite the high stresses found in the die cavity, removal of the support ring did not appear to result in any measurable change in cavity dimensions. This would tend to indicate that any subsequent use of the die assembly would not cause a sufficient redistribution of stresses as to bring about any further dimensional changes in the die cavity.

I claim:

1. A method of making a forging die block having an irregularly shaped cavity therein without welding or fusing which comprises, selecting a die block of a size that is adequate to have the cavity formed therein, calculating, according to known formulae, the dimensions of a ring which will extend around the die block and will provide an interference fit with it when assembled to prestress the die block material to substantially the yield strength of the die block material, heating the ring until it expands sufficiently to fit over the die block, placing the heated ring over the die block material and allowing it to cool thereby shrinking it around the die block and compressively stressing the die block material to said yield strength and forming an irregularly shaped forging cavity in the die block while it is held in such prestressed condition by the ring.

2. A method of making a forging die block according to claim 1, wherein the interengaging surfaces of the block and ring are cylindrical.

3. A method of making a forging die block having an irregularly shaped cavity therein without welding or fusing, which comprises stressing the die block by shrinking a metallic ring around it until the die block material is compressively stressed to a predetermined degree, stressing the die block substantially to the yield strength of the die block material, and forming an irregularly shaped forging cavity in the die block while it is held in such prestressed condition by the ring.

* * * * *

UNITED STATES PATENT AND TRADEMARK OFFICE
CERTIFICATE OF CORRECTION

PATENT NO. : 3,902,381
DATED : Sept. 2, 1975
INVENTOR(S) : Richard Couchman

It is certified that error appears in the above-identified patent and that said Letters Patent are hereby corrected as shown below:

Page 2, Column 2, line 68, change "permissable" to -- permissible --.

Page 3, Column 3, line 22 change "compresi" to -- compression --.

Signed and Sealed this fourth Day of May 1976

[SEAL]

Attest:

RUTH C. MASON
*Attesting Officer*

C. MARSHALL DANN
*Commissioner of Patents and Trademarks*